US007373361B2

(12) United States Patent
Monroe et al.

(10) Patent No.: US 7,373,361 B2
(45) Date of Patent: May 13, 2008

(54) MOBILE PROCESS AUTOMATION METHOD

(75) Inventors: Andrew Monroe, Philadelphia, PA (US); Andrew Leamon, Wayne, PA (US)

(73) Assignee: AirClic, Inc., Newtown, PA (US)

( * ) Notice: Subject to any disclaimer, the term of this patent is extended or adjusted under 35 U.S.C. 154(b) by 0 days.

(21) Appl. No.: 11/233,492

(22) Filed: Sep. 22, 2005

(65) Prior Publication Data
US 2006/0136902 A1   Jun. 22, 2006

Related U.S. Application Data

(60) Provisional application No. 60/612,440, filed on Sep. 23, 2004.

(51) Int. Cl.
*G06F 17/00* (2006.01)
*G06F 7/00* (2006.01)

(52) U.S. Cl. .................... 707/104.1; 705/28; 705/34; 717/170

(58) Field of Classification Search ............. 707/104.1; 717/170; 705/28, 34
See application file for complete search history.

(56) References Cited

U.S. PATENT DOCUMENTS

| 6,112,246 | A  | * | 8/2000  | Horbal et al. ............... 709/230 |
| 6,133,847 | A  | * | 10/2000 | Yang ..................... 340/825.22 |
| 6,286,038 | B1 | * | 9/2001  | Reichmeyer et al. ....... 709/220 |
| 6,725,281 | B1 | * | 4/2004  | Zintel et al. ................ 719/318 |
| 6,779,004 | B1 | * | 8/2004  | Zintel ........................ 709/227 |
| 6,801,940 | B1 | * | 10/2004 | Moran et al. ................ 709/224 |
| 6,892,230 | B1 | * | 5/2005  | Gu et al. .................... 709/220 |
| 6,910,068 | B2 | * | 6/2005  | Zintel et al. ................ 709/220 |
| 7,010,778 | B2 | * | 3/2006  | Cook .......................... 717/106 |
| 7,085,814 | B1 | * | 8/2006  | Gandhi et al. .............. 709/208 |
| 7,089,307 | B2 | * | 8/2006  | Zintel et al. ................ 709/224 |
| 7,107,340 | B2 | * | 9/2006  | Chkodrov et al. .......... 709/224 |

(Continued)

OTHER PUBLICATIONS

Lee, Burton H., "Embedded Internet Systems: Poised for Takeoff", IEEE Internet Computing, May-Jun. 1998, pp. 24-29.*
Wang, Shige, et al., "Reconfigurable Software for Open Architecture Controllers", ICRA 2001 Proceedings, vol. 4, Seoul, Korea, May 21-26, 2001, pp. 4090-4095.*
Chakravorty, Rajiv, et al., "Architecture and Implementation of a Remote Management Framework for Dynamically Reconfigurable Devices", ICON 2002, © 2002, pp. 375-380.*

(Continued)

*Primary Examiner*—John Breene
*Assistant Examiner*—Robert Stevens
(74) *Attorney, Agent, or Firm*—Morgan, Lewis & Bockius

(57) ABSTRACT

Remote devices communicate with a central server in order to provide event tracking information pertaining to a business process, which is conducted by persons performing multiple roles. Software, including a state machine, is downloaded onto the device. A first state table is also downloaded and applied to the state machine in order to configure the device to operate in accordance with a first role. While the device is configured to operate in accordance with the first role, field data is captured and processed with the state machine in accordance with the first state table to generate event tracking information, which is transmitted to the server. Then, a second state table is applied to the state machine previously downloaded in order to reconfigure the device to operate in accordance with a second role. The device is reconfigured from the first role to the second role without changing the state machine on the device. While the remote device is configured to operate in accordance with the second role, field data is captured and processed with the state machine in accordance with the second state table to generate event tracking information, which transmitted to the server.

8 Claims, 9 Drawing Sheets

U.S. PATENT DOCUMENTS

| | | | | |
|---|---|---|---|---|
| 7,130,895 | B2* | 10/2006 | Zintel et al. | 709/220 |
| 7,196,621 | B2* | 3/2007 | Kochis | 340/539.13 |
| 2002/0029256 | A1* | 3/2002 | Zintel et al. | 709/218 |
| 2002/0035621 | A1* | 3/2002 | Zintel et al. | 709/220 |
| 2003/0225820 | A1* | 12/2003 | Chkodrov et al. | 709/201 |
| 2004/0230858 | A1* | 11/2004 | Susskind | 714/1 |
| 2004/0260800 | A1* | 12/2004 | Gu et al. | 709/223 |
| 2005/0022210 | A1* | 1/2005 | Zintel et al. | 719/318 |
| 2005/0228874 | A1* | 10/2005 | Edgett et al. | 709/220 |
| 2006/0187026 | A1* | 8/2006 | Kochis | 340/539.13 |
| 2006/0265365 | A1* | 11/2006 | Chkodrov et al. | 707/3 |

OTHER PUBLICATIONS

Park, Jun-Ho, et al., "Middleware Architecture for Supporting Both Dynamic Reconfiguration and Real-Time Services", IEEE Transactions on Consumer Electronics, vol. 46, Issue 3, Aug. 2000, pp. 795-801.*

Sairam, K. V. S. S. S. S., et al., "Bluetooth in Wireless Communication", IEEE Communications Magazine, Jun. 2002, pp. 90-96.*

Menten, Lawrence E., "Experiences in the Application of XML for Device Management", IEEE Transactions on Consumer Electronics, vol. 42, Issue 7, Jul. 2004, pp. 92-100.*

* cited by examiner

Airclic WaterSE

[State]  ─202  [Regenerate]

```
G~OSC~f~t~-1~LOW~0~0~t~N~~f~~~1~f~-1~f~f~0~
$S~Invalid~0~Enter Container Id~0~0~T~~~Z~f~11
~OID~CONTAINER~~f~f~0~$I~O~Check eSeal~5678~~3
~f~-1~ACTION~SEALED~~f~f~0~$M~Container sealed?~0
~O~Yes~1~~-1~f~-1~TYPE~MAERSK~~f~f~0~O!No~0~~
+~f~-'~TYPE~MAERSK~~f~f~0~$M~eSeal exists?~0
~P~Exists~5~f~f~f~0~O~Missing~0~~7~f~-1
~TYPE~STATUS~missing~f~f~0~$S~Invalid~0~Enter ESeal
=~0~0~T~~~6~f~12~TYPE~ESEAL~~f~f~0~$M~eSeal
Status?~0~O~Intact~1~~7~f~-1
~TYPE~STATUS~Intact~f~f~0~O~Compromised~2~~11
~f~-1~TYPE~STATUS~Compromised~f~f~0
~O~Unreadable~3~~7~f~-1
~TYPE~STATUS~Unreadable~f~f~0~$I~T~2~~8~f~-1
~TYPE~LOCATION~~f~f~0~$I~N~~f~~~9~t~-1~f~f~0~
$I~N~~f~99799~~10~f~-1~f~f~0~$M~Txn Complete~0
~P~Do Another?~1~f~f~f~0~O~Logout~99702~~1~f~-1
~~~~f~f~0~$S~Invalid~0~Enter Month~2~0~N~~f~~~12
~f~-1~f~f~0~$I~V~13~month~7~$S~Invalid~0~Enter
Day~2~0~N~~f~~~14~f~-1~f~f~0~$I~V~15~day~7~
$S~Invalid~0~Enter Hour~2~0~N~~f~~~16~f~-1~f~f~0~
$I~V~17~hour~7~$I~T~{month}:{day}:{hour}~~7~f~-1
~TYPE~DATE~~f~f~0~$
```

```
n=CONTAINER~t=Container Id~u=f~b=f~d=t~=f~=0
~c=000000$n=SEALED~t=Check
eSeal~u=f~b=f~d=f~=f~=0~c=000000
$n=MAERSK~t=Maersk~u=f~b=f~d=f~=f~=0~c=
000000$n=ESEAL~t=Eseal #~u=f~b=f~d=f~=f~=0~c=
000000$n=STATUS~t=Sealed~u=f~b=f~d=f~=f~=0
~c=000000
$n=LOCATION~t=Location~u=f~b=f~d=f~=f~=0~c=
000000$n=DATE~t=Date~u=f~b=f~d=f~=f~=0~c=
000000$
```

State String | Format String

XML String | Sample XML

FIG. 2

MOBILE PROCESS AUTOMATION METHOD

CROSS REFERENCE TO RELATED APPLICATIONS

This application claims priority to U.S. Provisional Patent Application No. 60/612,440, filed Sep. 23, 2004, which is hereby incorporated by reference in its entirety.

BACKGROUND OF THE INVENTION

1. Field of the Invention

The present invention relates to systems and methods for mobile process automation.

2. Description of the Related Art

Existing mobile process automation solutions require bulky, expensive equipment and only allow for rigid, pre-defined process models. Project-based solutions often involve expensive, up-front development costs and long implementation times, thereby making it difficult to keep processes synchronized with the actual business. GPS-based solutions only provide information as to the location of people and assets, rather than what they are doing or what next steps might be required. There is a need in the art for a flexible solution with rapid process modeling that does not require an investment in IT infrastructure.

SUMMARY OF THE INVENTION

The present invention is directed to a method for varying the configuration of a remote device. The method operates in the context of a system that includes a central server and a plurality of remote devices. The remote devices communicate with the central server in order to provide to the central server event tracking information, including field data, pertaining to a business process. The business process is conducted by one or more persons performing multiple roles in the business process. Software, including a state machine, is downloaded onto the remote device. A first state table is downloaded to the remote device and applied to the state machine in order to configure the remote device to operate in accordance with a first role in the business process. While the remote device is configured to operate in accordance with the first role: (i) field data is captured using the remote device; (ii) the field data is processed with the state machine in accordance with the first state table to generate event tracking information; and (iii) the event tracking information is transmitted from the remote device to the central server in accordance with output from (ii). Then, a second state table is applied to the state machine previously downloaded in order to reconfigure the remote device to operate in accordance with a second role in the business process. The remote device is reconfigured from the first role to the second role without changing the state machine on the device. While the remote device is configured to operate in accordance with the second role: (i) field data is captured with the remote device; (ii) the field data is processed with the state machine and in accordance with the second state table to generate event tracking information; and (iii) the event tracking information is transmitted from the remote device to the central server in accordance with output from (ii).

The present invention is also directed to a method for providing access to event tracking information relevant to a business process, in the context of a system that includes a plurality of different service providers that provide services to a plurality of different business entities. Each of the business entities is associated with one or more of the business processes. Event tracking information relating to the business processes associated with at least two of the business entities is received at a central server from the service providers. Each item of the event tracking information is indicated as being associated with one of the business entities. The received event tracking information is organized in accordance with the indication. Access to the organized event tracking information is provided to each of the business entities.

BRIEF DESCRIPTION OF THE DRAWINGS

The invention will be described by reference to the preferred and alternative embodiments thereof in conjunction with the drawings in which:

FIG. 2 is an exemplary user interface showing a state string created in accordance with the present invention;

DETAILED DESCRIPTION

The present invention provides a flexible, mobile process automation solution that relies on a centrally-hosted infrastructure, thereby eliminating the need for users to invest in proprietary equipment and IT infrastructure. It provides for a simple, quick and inexpensive way of writing, modifying and optimizing applications based on business processes, and deploying such applications to the field.

Figure 1A:
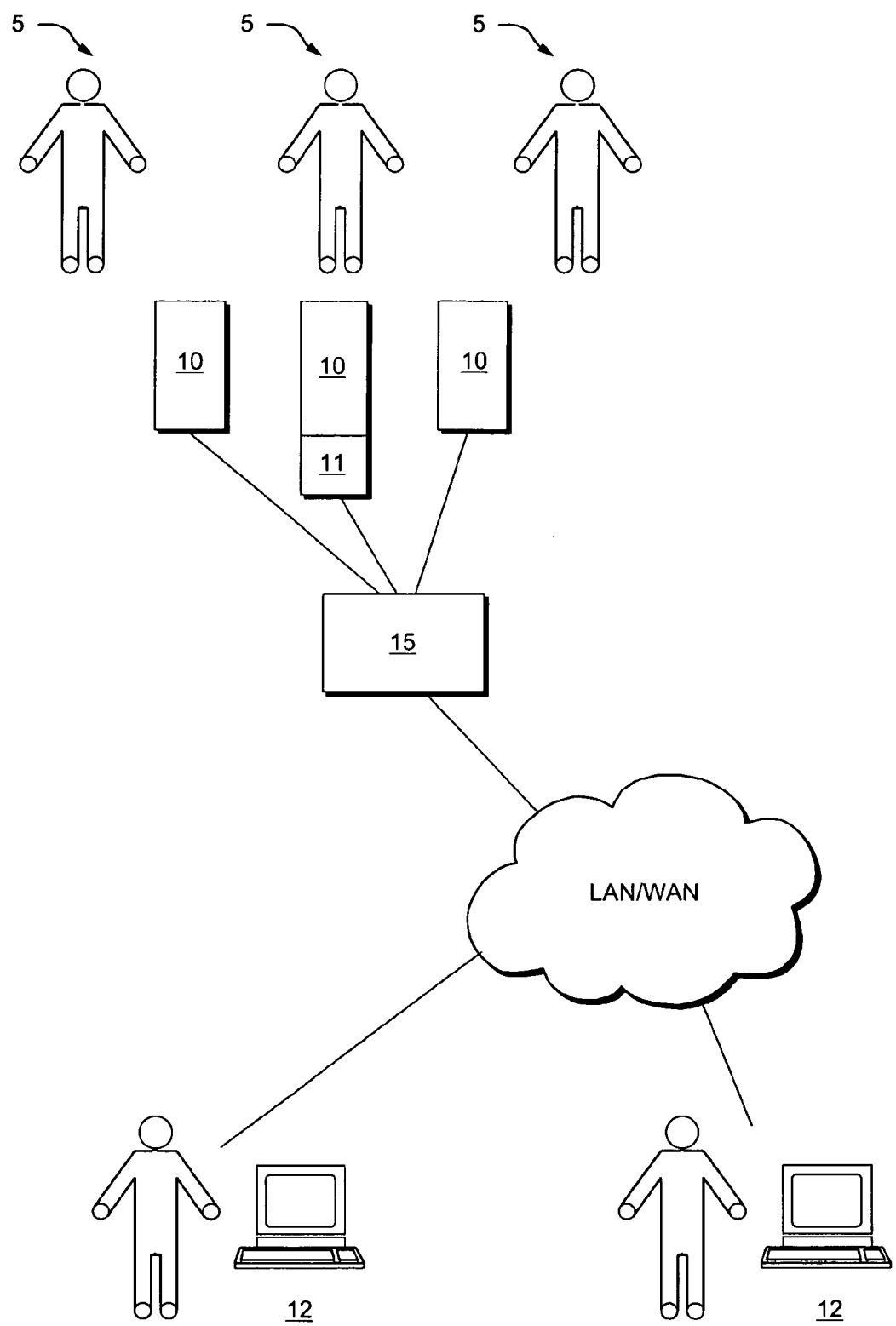
FIG. 1A is a preferred embodiment of a system of the present invention.

With reference to FIG. 1A, individuals 5 (e.g., workers in the field) employ remote devices 10 that communicate with central server 15. Such remote devices 10 may include, by way of example, mobile phones, personal digital assistants, and/or other handheld computing devices. In some embodiments, the remote devices 10 may include a scanning mechanism (e.g., RFID or barcode) 11 attached thereto. The software maintained on the remote device 10 is described below with reference to FIG. 1C. Users 12 access central server 15 to obtain information provided by remote devices 10. In one embodiment, the remote devices 10 communicate with central server 15 over a wireless data network, although hardwired forms of communication are within the scope of the present invention. Users 12 communicate with central server 15 over a network such as a WAN or LAN. Individuals 5 enter information (e.g., manually or by scanning bar codes or RFID tags) that represent actions, items, locations, events or other types of information. Existing codes may be used, or new codes can be created to represent information or record activities. In some embodiments, remote devices 10 are GPS-enabled, thereby allowing for the determination of the location of remote devices 10 (and, thus, individuals 5). Once entered, information is transmitted to central server 15, and available for review, querying or reporting, and for feeding to other back-end systems.

Figure 1B:
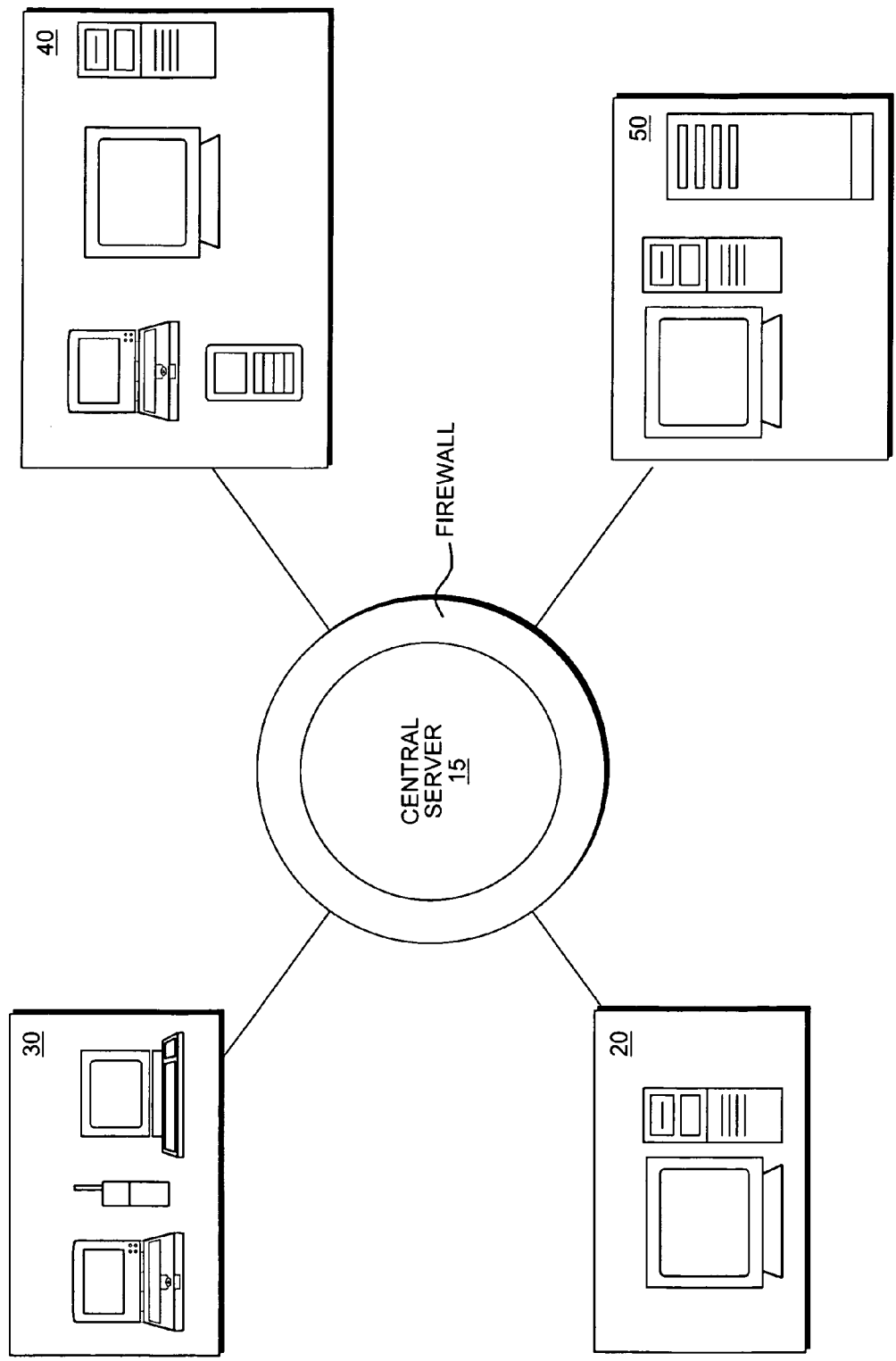
FIG. 1B is a representation of the components of a system of the present invention.

An exemplary embodiment of the inventive system includes four basic functional components, as represented in FIG. 1B. Design component 20 allows for process designers to graphically depict business processes and create functioning applications (i.e., through the creation of state diagrams) that can be transmitted to remote devices 10. As described in more detail below, a Microsoft Visio® diagram is created, and transformed into an application that can be run on remote devices 10. Capture component 30 allows for capturing data, using scanners, RFID, or key-entry, as described in more detail above. Reporter component 40 makes available (e.g., via web-based tools) to interested persons data collected using capture component 30. Harvest component 50 includes a back-end server utility that can deliver captured data in multiple formats for export to billing, time, asset-management, auditing, ERP, CRM, SCM and other business systems.

Figure 1C:
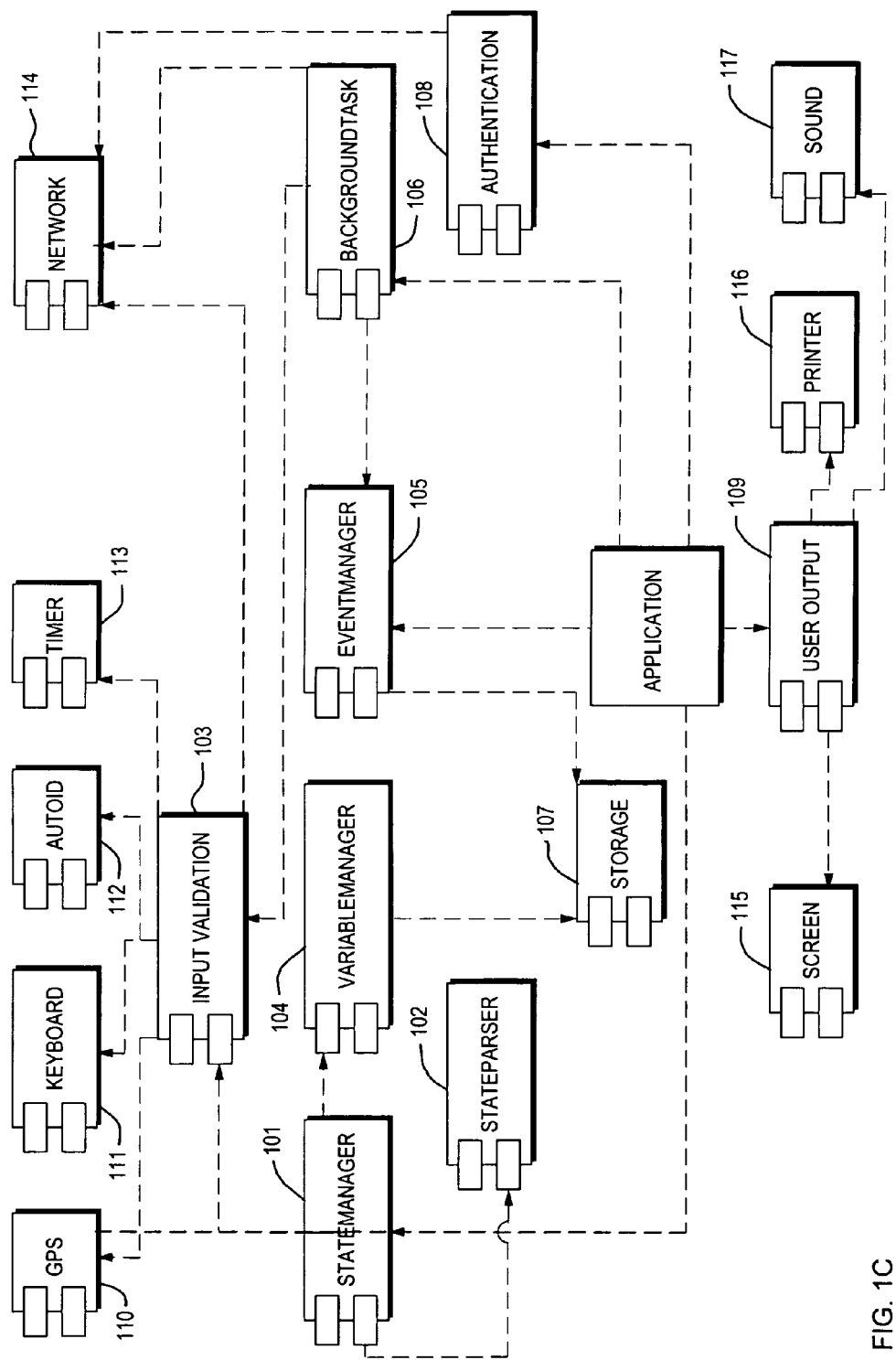
FIG. 1C is a representation of the components that may be maintained on a remote device in accordance with a preferred embodiment of the present invention.

In a preferred embodiment of the present invention, the software loaded onto the remote device 10 is comprised of a set of components that control inputs, outputs, logic and state. A diagram providing an exemplary illustration of these components is shown in FIG. 1C. It will be understood by those skilled in the art that the components described herein are exemplary; additional or different components may be used in other embodiments of the present invention. The core components are as follows. The State Machine 101 controls the current state of an application running on remote device 10. It depends upon the State Parser 102 to create a new State Machine 101 and upon Input Validation 103 to move through the states. The Variable Manager component 104 maintains current values for variables and collections used in the State Machine 101. The Event Manager 105 maintains the current user's business event, background business event and history of previous business events. The Background Task component 106 collects information on behalf of the user automatically to report status and perform upload.

The services include the following. The State Parser 102 takes a compressed representation of the State Machine 101 diagram and generates a runtime instance. The Storage 107 service handles persistence of all data to ensure business event integrity across restarts. It also stores variables, the State Machine 101 state, incomplete and complete business events, and the compressed State Machine 101 diagram. The Authentication service 108 validates the identity of the user and registers a session with the service provider (e.g., at central server 15).

The utilities include the following. The Input Validation utility 103 ensures valid input based a set of constraints defined within the State Machine 101. The User Output utility 109 alerts and informs the user of the current state. It also requests inputs based on the current state of the State Machine 101.

The input/output mechanisms include the following. GPS 110 captures the user's current location. The Keyboard 111 allows the user to input data. The AutoID 112 is a simplistic form of user input utilizing a scanner or RFID, for example. The Timer 113 generates data based upon predefined timed events from the State Machine. The Network 114 allows a remote device 10 to retrieve new applications and upload data. The Screen 115 is the basic means of providing information to a user of the application. The Printer 116 allows for hardcopy output. Sound 117 provides for alerting for invalid input and successful completion.

In order to create a functioning application from a visual depiction of a business process, the user must first create a state diagram. The Appendix describes one exemplary way in which such state diagrams can be created, using MicroSoft Visio®. Workflow creation programs other than MicroSoft Visio® can be used within the scope of the present invention. Through use of a translator, the state diagram is converted into a state string (an example of which is shown in FIG. 2), representing an application that can be processed by the remote device. After creation, this state string/application is stored in a central repository (i.e., central server 15). The central repository also maintains a configuration for all users of the system and maintains an association of the state strings with the users, as applicable.

From the field, when a user logs in, he can download the latest version of his application(s) from central server 15 to his remote device, either wirelessly or using a wired network. The framework installed on the remote device (described above with reference to FIG. 1C) allows the user to accomplish this. In order to gain access to the application(s), in the preferred embodiment, the user is required to input into the remote device user identification information (which uniquely identifies a particular user from all other users of the system) and a license key (which uniquely identifies the application of interest).

The present invention is useful in a variety of different contexts, such as, by way of example, logistics and transportation, operations, sales and field services, security and emergency services, and education. Other contexts for employing the present invention will be known to those skilled in the art. As will be apparent from the examples provided below, the present invention achieves visibility, accountability and operational efficiency.

With respect to logistics and transportation, the present invention can be used to track couriers, shipments, driver locations or other assets in motion. By way of example, the present invention can be used to scan packages upon pickup, warehousing, and delivery; capture proof of delivery to populate invoices; measure driver wait-times; improve service by matching promised pickup/delivery times with pickup and signature-capture ties; obtain visibility into the time/location of individual shipments for better service; and match manifests with shipments and capitalize on conjunctive routing.

In a particularly unique embodiment of the present invention, visibility is provided into outsourced distribution services. By way of example, assume Company A outsources distribution of its Product ABC to multiple trucking companies. The business process associated with such distribution includes: Step 1: Picking up Product ABC from distribution center; and Step 2: Delivering Product ABC to customer. A state diagram is created for this process and the resulting application is downloaded to the mobile phone of each trucking company driver responsible for delivering Product ABC. So, for example, upon picking-up Product ABC from the warehouse, Driver Joe of J&J Trucking scans the package; information representing this activity (i.e., a particular package containing Product ABC was picked-up from the warehouse by Driver Joe at 8:00 am) is submitted to a central location (e.g., central server 15). Driver Joe then delivers the package to the customer and, upon doing so, scans the package again. Information representing the delivery is also transmitted to the central location. Drivers from other trucking companies also deliver packages of Product ABC for Company A. Such drivers may have the application downloaded to their remote devices and engage in similar activities as those described with respect to Driver Joe.

Company A may then obtain all of its distribution information from a centralized location, rather than having to integrate its systems with multiple different trucking companies.

By way of further example, assume Company A changes its business process to add tighter security for its products. In particular, Company A adds a third step (Step 3: Obtaining a signed customer receipt as proof of delivery) to its business process. In prior art solutions, Company A would be required to have a computer programmer create new code representing the revised application (including elements represented by the framework of the present invention, an example of which is described above with reference to FIG. 1C), call back each remote device of each driver, and reload the new application on each handset. In accordance with the present invention, the Visio diagram may simply be changed (see Appendix A) to reflect the new business process, and a state diagram created there from and transmitted to the device of each individual involved in such business processes. This can be accomplished without having to change the state machine on the device.

In a variation on this example, assume Driver Jim also works for J&J Trucking, along with Driver Joe. Driver Jim is responsible for obtaining signed customer receipts and returning them to Company A. Obtaining a signed customer receipt and returning it to Company A is part of Company A's business process (and an application has been created therefor in accordance with the present invention). Assume further in this example that Driver Jim and Driver Joe share a remote device. Upon completion of Driver Joe's delivery task, he may provide the device to Driver Jim, who downloads the application relevant to his portion of Company A's business process.

Assume further, in this example, that one or more of such trucking companies service Company X in connection with its distribution of Product XYZ. Company X has its own business process to be followed in connection with the delivery of Product XYZ. In this example, Driver Joe also delivers Product XYZ for Company X and, thus, maintains two applications on his remote device—one for delivery of Product ABC and one for delivery of Product XYZ. In one embodiment, Driver Joe's remote device may indicate (e.g., by color coding) the applications applicable to Company A and the applications applicable to Company X. Information collected by Driver Joe in the field for Company X is designated as such and maintained at the central server in an account separate from the information collected by Driver Joe for Company A.

In the operations context, the present invention can be used to meet the logistical challenges inherent in maintenance and repair processes, which are labor- and parts-intensive. By way of example, the present invention can be used to obtain a real-time picture of parts inventories; view the precise status of a complex repair job (i.e., what workers are assigned to it, what steps are complete, what steps remain); readily schedule mobile repair technicians; close MRO work orders from the shop floor, without delays or paperwork; quickly identify parts and supplies that need replenishment as they are consumed; and simplify technician dispatching for emergency jobs by seeing what workers are available, close to the job, has the needed parts and the required skills.

With regard to sales, the present invention provides accurate and timely information on the sales cycle, which allows for making a determination as to whether a sales team is operating at peak productivity. By way of example, the present invention can be used to track individual sales opportunities; assign probabilities and potential values to various accounts; monitor sales rep performance over time; and manage individual prospects and view the entire sales cycle to spot opportunities or threats. With regard to field services, as a result of being able to obtain immediate and accurate information about remote field-based business processes, the present invention provides an invaluable solution for organizations that want to provide the highest levels of customer service. In particular, by way of example, the present invention can be used to accelerate product field service and repair; achieve real-time management of customer-service processes; close work orders from the field as jobs are complete; create audit trails of all processes, including location, time, date and action; view estimated time to completion; and improve inventory control of replacement parts.

With regard to security and emergency services, the present invention is useful in tracking and managing these inherently mobile processes. By way of example, the present invention can be used by security personnel to scan various check-in stations on their regular rounds, thereby giving precise time and location data that confirms conformance with security procedures; first responders to manage triage in emergencies and transportation to medical facilities; and homeland security officials to track containers, shipping manifests, and other shipping/receiving duties.

Finally, with regard to education applications, the present invention can be used to provide real-time information that streamlines daily processes, such as tracking attendance, meals consumption, and food and textbook inventories. For example, the present invention can be used to view student schedule data and parent contact information, respond to student emergencies, incident and other needs; record and publish attendance data; manage textbook and supply inventory; optimize meal payments and increase accuracy for revenue maximization; log buses, riders and locations; and improve school maintenance and security.

Figure 3:
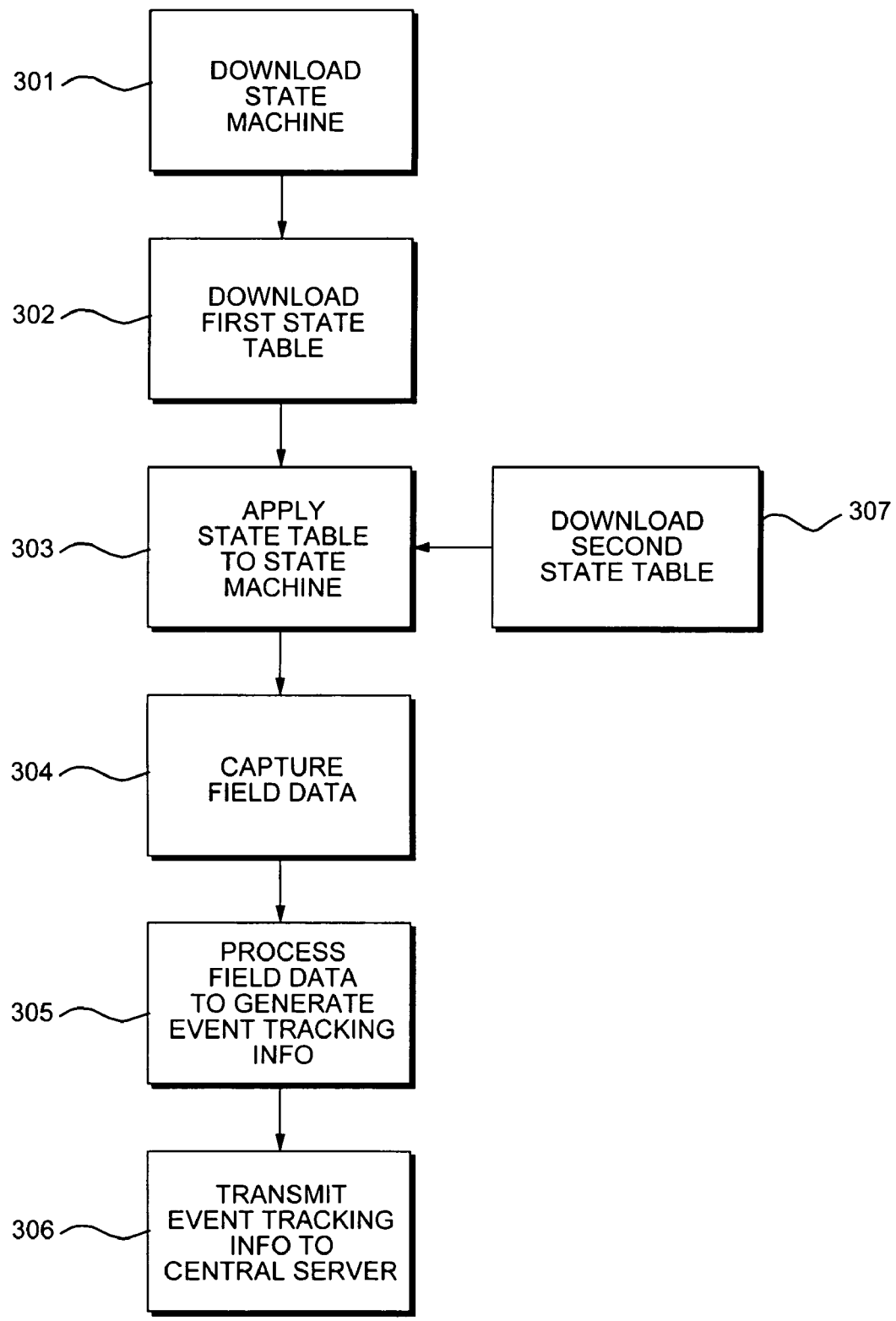
FIG. 3 is a flow chart illustrating a preferred embodiment of a method of the present invention.

A preferred embodiment of a method for varying the configuration of remote devices is illustrated in the flow chart depicted in FIG. 3. The method operates in the context of a system (e.g., the system depicted in FIG. 1A) that includes a central server 15 and a plurality of remote devices 10. The remote devices 10 communicate with the central server 15 in order to provide event tracking information, including field data, relevant to a business process to the central server. The business process is conducted by one or more persons performing at least first and second different roles in the business process. In step 301, software comprising a state machine is downloaded onto a remote device (e.g., the state machine 101 of FIG. 1C). In step 302, a first state table is downloaded to the remote device. In step 303, the first state table (e.g., state diagram 202 of FIG. 2) is applied to the state machine in order to configure the remote device 10 to operate in accordance with the first role in the business process. In steps 304, 305, and 306, respectively, while the remote device 10 is configured to operate in accordance with the first role, the field data is captured using the remote device 10; the field data is processed with the state machine in accordance with the first state table to generate event tracking information; and event tracking information associated with the business process is transmitted from the remote device 10 to the central server 15 in accordance with output from step 305. In step 307, the second state table is downloaded to the remote device. In step 303, the second state table is applied to the state machine previously downloaded in order to reconfigure the remote device 10 to operate in accordance with the second role in the business process. The remote device is reconfigured from the first role to the second role without changing the state machine on the remote device 10. In steps 304, 305, and 306, respectively, while the remote device is configured to operate in accordance with the second role, the field data is captured with the at least one remote device; the field data is processed with the state machine in accordance with the second state table to generate event tracking information; and event tracking information associated with the business process is transmitted from the remote device 10 to the central server 15 in accordance with output from step 305.

Figure 4:
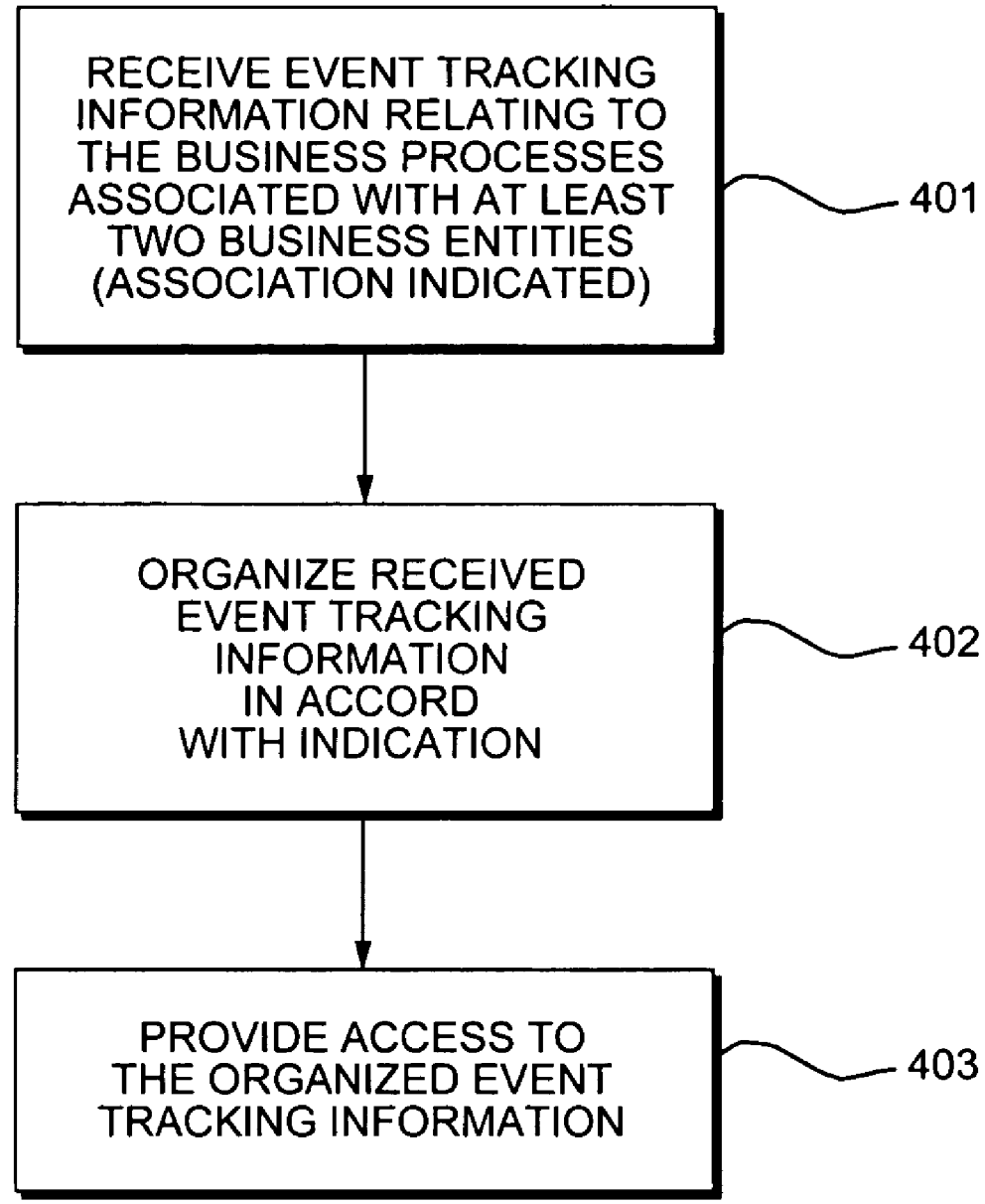
FIG. 4 is a flow chart illustrating a preferred embodiment of a method of the present invention.

A preferred embodiment of a method for providing access to event tracking information relevant to a business process is illustrated in the flow chart depicted in FIG. 4. The method is carried out in the context of a system that includes a plurality of different service providers who provide services to a plurality of different business entities. Each of the business entities is associated with one or more of the business processes. Event tracking information relating to the business processes associated with at least two of the business entities is received, in step 401, at a central server from the service providers. Each item of the event tracking information is indicated as being associated with one of the business entities. The received event tracking information is organized in accordance with the indication, in step 402. Access to the organized event tracking information is provided to each of the business entities, in step 403.

Having thus described illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

APPENDIX

Figure 5:
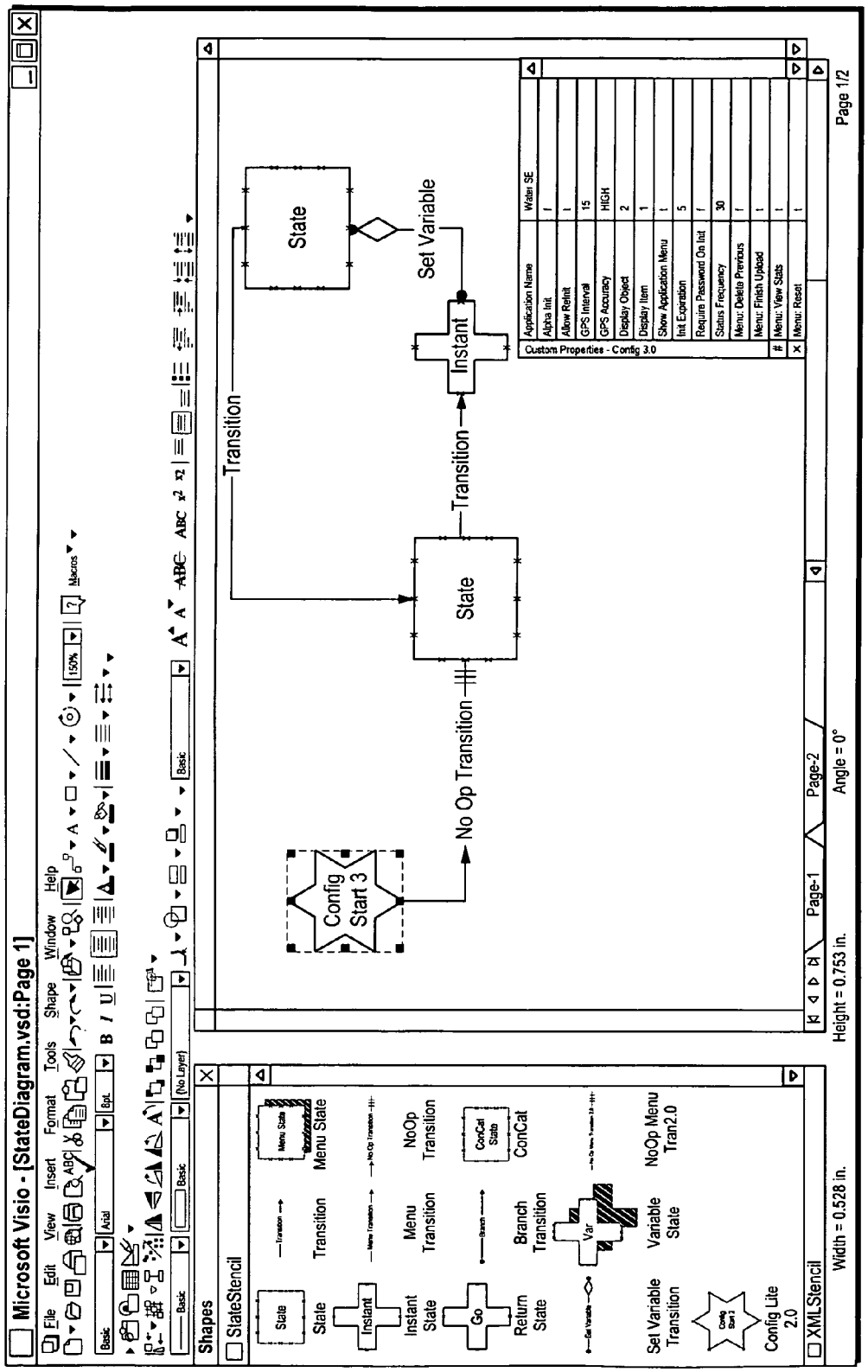
FIG. 5 is an exemplary user interface that may be employed to created a diagram in accordance with the present invention.

The following provides an exemplary process for creating a state diagram that may be used in connection with the present invention, including an explanation of the basic usage of some exemplary shapes used to create the diagram. The user maintains in a directory on the user's computer one or more stencil files containing the shapes and a .vsd file. Visual Basic for Applications should be installed and macros enabled for the stencil and the .vsd document. The user can create a state diagram using the shapes provided. When the user opens the .vsd file, the stencil file opens as well. An exemplary interface is shown in FIG. 5. If the user wants to generate new or additional diagrams, the user may create another tab in the .vsd file by right clicking on the tab named Page-1 at the bottom and selecting "Insert Page . . . " or may save the current diagram as a second diagram. When using multiple tabs, the user can press the save button while viewing the diagram for which the user wants to generate the State String. In either case, the user should be using a Visio diagram that originally derived from the .vsd file to ensure that the correct macros are included.

Certain exemplary shapes are described in Table 1. Other custom shapes may be created and used within the scope of the present invention.

TABLE 1

| Properties | Description | Values |
|---|---|---|
| SYMBOL TYPE: STATE | | |

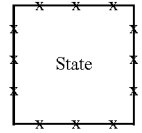

Overview: Displays a message on the handset. A person can then scan or manually enter a code that matches a transition leaving this state. A soft key transition is possible off of this state.

| | | |
|---|---|---|
| Message | Text label that appears above the entry field on the handset | Any text label (including variables) |
| Error Message | Error message that appears on the handset for an invalid entry | Any text label (including variables) |
| Entry Type | Restrict input access based on these values | −1 = Scan Only<br>0 = Alphanumeric<br>1 = Email Address<br>2 = Numbers, only<br>3 = Phone Number<br>4 = URL<br>65536 = Password<br>701 = Date<br>702 = Time<br>703 = Date & Time<br>For MIDP 2.0 use, only<br>5 = Decimal<br>524288 = Alphanumeric, Non-predictive (T9 Input Word Mode, attempts to match words as they are typed) |

TABLE 1-continued

| Properties | Description | Values |
|---|---|---|
| SYMBOL TYPE: TRANSITION ——Transition——▶ Overview: Defines a constraint based on prefix, postfix and length. Adds service key data to the scan history item when fired. | | |
| Prefix | Allows for the restriction of code values, only accept values starting with<br>In some versions, the '?' can be used to indicate that any character may match. For example, if the user wants to make sure the third character is a certain value, set the prefix to ??4<br>In other versions, an <u>InitList</u> can be referenced to create a set of transitions using one transition. For example, {WORKERS(INC)} would create a set of transitions using the items in list WORKERS with the attribute INC. | Leave blank to accept all<br>{value}—Insert variable name to be replaced<br>?—Indicates any character<br>{listname(attr)}—Insert listname and attr to be referenced (3.0 & above) |
| Postfix | Allows for the restriction of code values, only accept values ending with | Leave blank to accept all<br>{value} = Insert variable name to be replaced<br>? - Indicates any character |
| Show Date In Track | Ability to display or suppress the date in Track | t = True (Display)<br>f = False (Suppress) |
| Auto Upload | Allows for uploading of the business event to the platform; data is removed from the handset upon successful upload | t = True (Upload)<br>f = False (No upload) |
| Length | Sets the allowed field length for a code value<br>Some versions provide multiple transitions to support numerous field lengths<br>Other versions support ranges e.g. 1-5 | −1 = Accept any length<br>N = Number<br>N-N |
| Add serviceKeyA | Values entered here will appear in the serviceKeyA field in the harvested data<br>Note: Variables may be referenced in this field | Examples<br>OID = Primary search object<br>SUBOID = Secondary search object<br>ACTION<br>TYPE |
| Add servicekeyB | Values entered here will appear in the serviceKeyB field in the harvested data; Also used to format data on Track Web<br>Note: Variables may be referenced in this field | Examples<br>Job_Number<br>OrderID |
| Add serviceKeyC | Values entered here will appear in the serviceKeyC field in the harvested data; This will also appear on the handset next to the submitted value<br>Note: Variables may be referenced in this field | Examples<br>Job #:<br>Qty: |
| GPS | Allows for capturing of GPS locations and coordinates | t = True (GPS ON)<br>f = False (GPS OFF) |
| End Code on Upload | On upload, allows to specify the type of end code to use. At least one TYPE=END or TYPE=ENDEVT code should be provided during an upload. | −1 = Suppress<br>0 = End Evt<br>1 = End |
| Priority | Controls the precedence for multiple transitions | 1-100 |

TABLE 1-continued

| Properties | Description | Values |
|---|---|---|
| | SYMBOL TYPE: MENU STATE | |
| | Overview: Displays a message and menu options based on the menu transitions leaving this state. A person can also scan from this state if there is a non-Menu transition leaving this state. | |
| Menu Title | This value will be used to display a title for the menu that this state will display. | Any {value} = Insert variable name to be replaced |

Figure 6A:
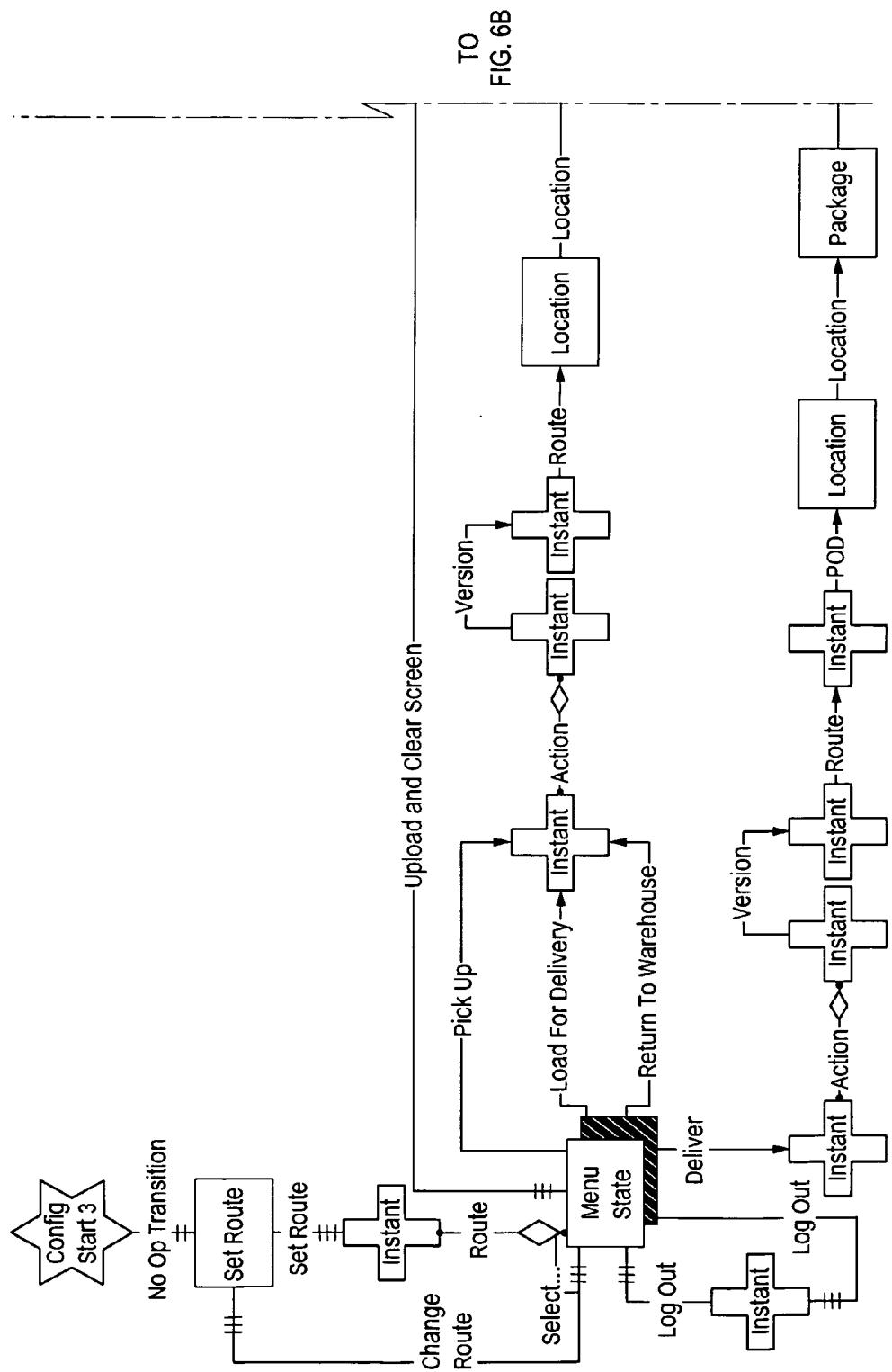
FIGS. 6A and 6B illustrate an exemplary diagram created in accordance with the present invention.
Figure 6B:
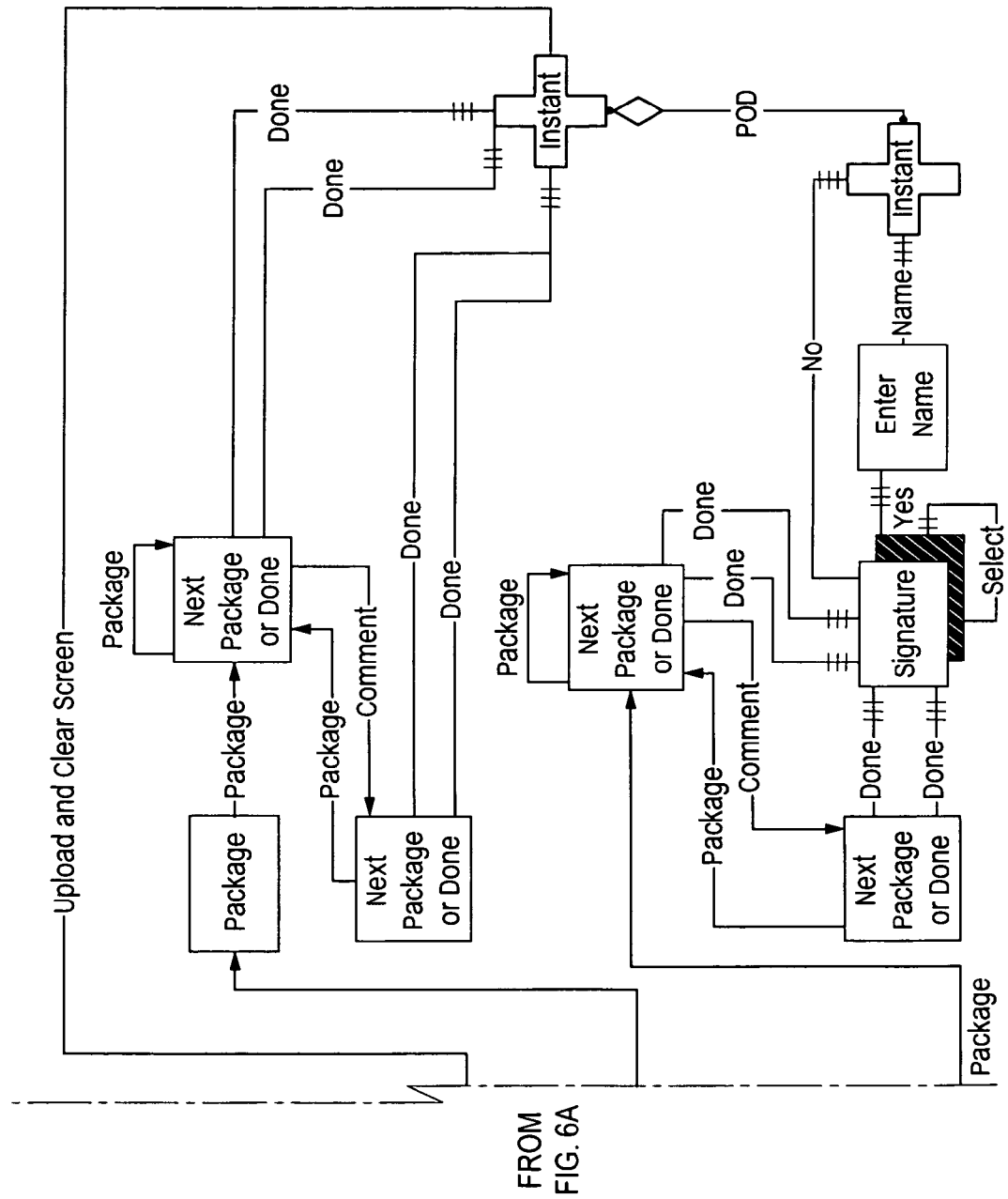

FIGS. 6A and 6B show an exemplary diagram created in accordance with the present invention, illustrating a business process.

The following describes exemplary implementation information pertaining to programming the application to be run on the remote device.

Soft Key Transitions

When a Menu Transition or No-Op Menu Transition is also present on a regular State, it will be available via the second soft key or appear in the remote device menu. There is a limit of one per state, in the preferred embodiment. Examples are provided below.

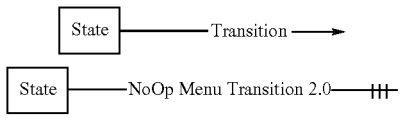

Scanning From Menus

A non-menu Transition connected from a Menu state will result in allowing the user to scan from that Menu state. A soft key/device menu selection entitled "Scan" will activate the scanner. Multiple transitions are allowed. Examples are provided below.

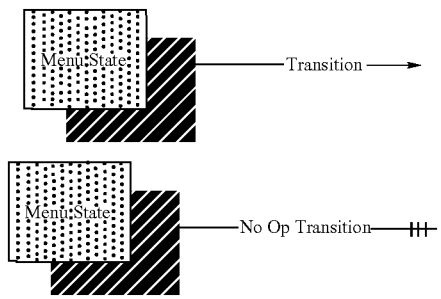

Variable Functions

Variable Functions may be entered in the "Other" field of the Set Variable 2.0 Transition. These functions allow the user to perform arithmetic functions with both variables and constants as operands. The operations that are available include: addition, subtraction, multiplication, division, and modulus. These functions may only contain two operands (one operation), of which both must be integers in value. (Decimal values are not supported) Several examples follow with descriptions.

| | |
|---|---|
| Other: ={var1}+7 | (adds 7 to the value of variable var1) |
| Other: =7+{var1} | (adds 7 to the value of variable var1) |
| Other: ={var1}−{var2} | (subtracts var2 from var1) |
| Other: =34*{var2} | (34 multiplied by var2) |
| Other: ={var1}/2 | (var1 divided by 2) Note: remainders are ignored |
| Other: ={var1}%2 | (var1 modulus 2) Note: this is the remainder from a division operation |

Image Support

Through the query state, it can be provided that codes be dispositioned. This will bring back the titles and display them on the device. The presence of a parameter on the code called PICTURE will also allow for the retrieval of an image for that code too. A typical use case is license identification. The parameter should be called PICTURE and should be set equal to a url. This url can be a relative path or absolute path. If it is a relative path, the code number+.png will be appended onto the url.

Lists

Lists allow an individual to store information in a group, thereby allowing the user to upload such grouped information onto the handset from the list. This allows for the pre-loading of data (e.g., manifests, locations the user needs to visit that day etc.).

GPS

The user's location can be captured (for GPS-enabled devices) and used in connection with the workflow, in some embodiments.

Automatic Collection of Data

The state diagram can be configured in a way that will cause certain data to be entered or actions be performed automatically without the user's interaction. For example, GPS data may be captured automatically. Another example relates to tracking children on and off busses. The bus stops must be broken up into separate business events without any interaction with the remote device. Within the diagram, the user can configure the speed of the bus that will trigger the end of a business event and force an upload. Thus, when the bus pulls away and exceed, e.g., 5 mph, an upload will occur.

What is claimed:

1. In a system that includes a central server and a plurality of remote devices, wherein the remote devices communicate with the central server in order to provide event tracking information relevant to a plurality of different business processes associated with a plurality of different business entities to the central server, wherein each of the business processes is conducted by one or more persons associated with a service provider that performs services for the plurality of different business entities, wherein said persons perform at least first and second different roles in the business process, wherein said first and second roles each control an operation of one or more of (i) one or more persons and (ii) one or more devices on the network, a method for varying a configuration of at least one of the remote devices, comprising:
   (a) downloading software comprising a state machine interpreter onto the remote device;
   (b) downloading a first state table to the remote device and applying the first state table to the state machine interpreter in order to configure the remote device to operate in accordance with the first role in the business process;
   (c) while the remote device is configured to operate in accordance with the first role:
      (i) capturing field data with the remote device;
      (ii) processing, with the state machine interpreter and in accordance with the first state table, the field data to generate the event tracking information associated with the business process; and
      (iii) transmitting the event tracking information from the remote device to the central server in accordance with output from step (c)(ii);
   (d) downloading a second state table to the remote device and after step (c), applying the second state table to the state machine interpreter previously downloaded in step (a) in order to reconfigure the remote device to operate in accordance with the second role in the business process, wherein the remote device is reconfigured from the first role to the second role without changing the state machine interpreter on the remote device;
   (e) while the remote device is configured to operate in accordance with the second role:
      (i) capturing the field data with the at least one remote device;
      (ii) processing, with the state machine interpreter and in accordance with the second state table, the field data to generate the event tracking information; and
      (iii) transmitting the event tracking information associated with the business process from the remote device to the central server in accordance with output from step (e)(ii);
   (f) at the central server, associating the event tracking information transmitted in steps (c)(iii) and (e)(iii) with an indication that the event tracking information is associated with one of the business entities; and
   (g) processing the event tracking information in accordance with the indication.

2. The method of claim 1, wherein the system further comprises a graphical user interface for inputting a definition of the business process to be stored at the central server; wherein, based on the definition of the business process, the central server automatically generates the first state table for the first role in the business process and the second state table for the second role in the business process.

3. The method of claim 1, wherein the remote device includes a machine reader that automatically detects machine readable articles, and wherein the steps c(i) and e(i) include automatically detecting machine readable articles as part of the field data.

4. The method of claim 1 further comprising:
   (h) providing to one of the business entities only the processed event tracking information that is associated with the one of the business entities.

5. A system for capturing event tracking information comprising:
   a central server;
   one or more persons, who are associated with a service provider that performs services for a plurality of different business entities, and who conduct a plurality of different business processes associated with the plurality of different business entities by performing at least first and second different roles in the business process, wherein said first and second roles each control an operation of (i) one or more persons and (ii) one or more devices on the network;
   a plurality of remote devices in communication with the central server and used by the persons to gather the event tracking information and provide the event tracking information to the central server, wherein a configuration of the remote devices is varied by
      (a) downloading software comprising a state machine interpreter onto the remote device;
      (b) downloading a first state table to the remote device and applying the first state table to the state machine interpreter in order to configure the remote device to operate in accordance with the first role in the business process; and
      (c) while the remote device is configured to operate in accordance with the first role:
         (i) capturing field data with the remote device;
         (ii) processing, with the state machine interpreter and in accordance with the first state table, the field data to generate the event tracking information associated with the business process; and
         (iii) transmitting the event tracking information from the remote device to the central server in accordance with output from step (c)(ii);
      (d) downloading a second state table to the remote device and after step (c), applying the second state table to the state machine interpreter previously downloaded in step (a) in order to reconfigure the remote device to operate in accordance with the second role in the business process, wherein the remote device is reconfigured from the first role to the second role without changing the state machine interpreter on the remote device;
      (e) while the remote device is configured to operate in accordance with the second role:
         (i) capturing the field data with the at least one remote device;
         (ii) processing, with the state machine interpreter and in accordance with the second state table, the field data to generate the event tracking information; and
         (iii) transmitting the event tracking information associated with the business process from the remote device to the central server in accordance with output from step (e)(ii);

wherein, at the central server, the event tracking information transmitted in steps (c)(iii) and (e)(iii) is associated with an indication that the event tracking information is associated with one of the business entities and is processed in accordance with the indication.

6. The system of claim 5, wherein the system further comprises a graphical user interface for inputting a definition of the business process to be stored at the central server; wherein, based on the definition of the business process, the central server automatically generates the first state table for the first role in the business process and the second state table for the second role in the business process.

7. The system of claim 5, wherein the remote device includes a machine reader that automatically detects machine readable articles, and wherein the steps c(i) and e(i) include automatically detecting machine readable articles as part of the field data.

8. The system of claim 5 wherein one of the business entities is provided only the processed event tracking information that is associated with the one of the business entities.

* * * * *